United States Patent [19]

Ogilvie et al.

[11] Patent Number: 5,125,677
[45] Date of Patent: Jun. 30, 1992

[54] HUMAN POWERED MACHINE AND CONVEYANCE WITH RECIPROCATING PEDALS

[76] Inventors: Frank R. Ogilvie, P.O. Box 448, Leavenworth, Wash. 98826; James W. Ogilvie, 4601 Annaway Dr., Edina, Minn. 55436

[21] Appl. No.: 646,851

[22] Filed: Jan. 28, 1991

[51] Int. Cl.⁵ .................. B62M 9/00; B62M 25/00
[52] U.S. Cl. .................. 280/236; 280/251; 280/282; 280/252; 440/25; 440/48; 482/57
[58] Field of Search ............... 280/236, 238, 251, 252, 280/258, 282; 440/25, 24, 21, 48, 98; 272/70, 71, 72, 73

[56] References Cited

U.S. PATENT DOCUMENTS

| | | | |
|---|---|---|---|
| 1,575,786 | 3/1926 | Parr | 280/251 |
| 1,587,650 | 6/1926 | Johnson | 280/251 |
| 1,731,493 | 10/1929 | Harris | 440/48 |
| 3,572,700 | 3/1971 | Mastropaelo | 280/252 X |
| 3,922,005 | 11/1975 | Bundschuh | 280/251 X |
| 4,052,912 | 10/1972 | Vukelic | 440/24 X |
| 4,700,962 | 10/1987 | Salmon | 272/72 X |
| 4,781,630 | 11/1988 | Gestsch | 280/258 X |
| 4,790,552 | 12/1988 | Lian | 280/238 X |
| 4,846,488 | 7/1989 | Szadkowski | 280/251 X |
| 4,867,716 | 9/1989 | McFarland | 440/48 |
| 4,900,013 | 2/1990 | Rodgers, Jr. | 272/70 |

*Primary Examiner*—Charles A. Marmor
*Assistant Examiner*—Kevin Hurley
*Attorney, Agent, or Firm*—Boniard I. Brown

[57] ABSTRACT

A machine powered by forces exerted by the machine user on machine driving members, such as pedals, which drive a rotary driven member through a unique variable ratio drive system. The machine may be constructed and arranged for use as either a vehicular conveyance for the machine, user or a stationary exercise machine both of which operate in a manner that provides an effective therapeutic exercise for certain orthopedic problems, particularly spine and leg problems. A drive system for the machine and other uses.

26 Claims, 7 Drawing Sheets

HUMAN POWERED MACHINE AND CONVEYANCE WITH RECIPROCATING PEDALS

BACKGROUND OF THE INVENTION

1. Field of the Invention

This invention relates generally to user powered machines, that is machines of the class which are powered by forces exerted by the machine user or operator to drive a movable driven member. The invention relates more particularly to novel machines of the class described which may be constructed and arranged for use as either a vehicular conveyance for the machine user or a stationary exercise machine and whose operation provides an effective therapeutic exercise for certain orthopedic problems, particularly spine and leg problems. The invention relates also to a novel drive system for the machines and other uses.

2. Prior Art

Over the years, a wide variety of user powered machines of the general class described, i.e. exercise machines and user powered vehicles, have been devised. User powered vehicles include land, water, and, just recently, air vehicles. The present invention is concerned with machines of this kind which, broadly stated, are characterized by (a) user actuated means, such as foot actuated pedals or arm actuated members, on which the machine user exerts forces to move the actuated means in a certain machine operating or driving motion, (b) rotary driven means, and (c) a mechanical power transmission means connecting the user actuated means and the driven means in such a way that movement of the user actuated means by the machine user drives the driven means in rotation. The driven means of user powered vehicles are vehicle propelling or driving members, such as drive wheels in the case of land vehicles and propellers in the case of water and air vehicles. In the case of exercise machines, the driven means is a rotor or the like whose rotation is resisted in some way to resist movement of the user actuated means by the machine user.

Among the user powered vehicles of this kind are bicycles, other types of wheeled vehicles including small cars for children, boats, and, more recently, a lightweight airplane. In many of these vehicles, and most notably bicycles, the user actuated means are pedals rotatably mounted on a rotary crank, and the mechanical power transmission comprises a sprocket chain trained about a drive sprocket on the crank and a driven sprocket coupled to the driven vehicle propelling means. Rotation of the crank by the vehicle user drives the propelling means in rotation to propel the vehicle. The transmission may have sprockets of different diameters and shift means for shifting the sprocket chain between these different sized sprockets to vary the drive ratio of the transmission. The pedals are offset along and 180 degrees about the shaft axis so that each pedal is rotatable through a power stroke, comprising about one half of each crank revolution, by the force of the user's foot on the pedal and through a return stroke, comprising the remainder of each crank revolution, by the force of the user's other foot against the other pedal.

In other pedal driven vehicles, such as small pedal driven cars for children, the pedals are movable back and forth with a generally reciprocatory motion longitudinally of the vehicle. The pedals are drivably connected to the vehicle propelling means by a mechanical power transmission including connecting rods pivotally attached to the pedals and to crank portions of a driven shaft drivably coupled to the vehicle drive wheels. These crank portions are offset along and 180 degrees about the shaft axis so that reciprocatory movement of the pedals drives the shaft in rotation to propel the vehicle. Each pedal is movable through a power stroke in one longitudinal direction of the vehicle by the force of the user's foot against the pedal and through an opposite return stroke by the force of the user's other foot against the other pedal.

While all of the existing user powered vehicles of the class described are satisfactory for their intended purposes, most if not all are designed for recreational and/or transportation use only by relatively strong, healthy, agile persons. As a consequence, the vehicles have certain features which render the vehicles difficult or impossible to use by many persons, such as persons having less than average agility or strength or persons who suffer from certain orthopedic problems. These features also render the vehicles unsuitable for optional use as therapeutic exercise machines for treating certain leg and other orthopedic problems.

Among the foremost of these features are the following. The pedals of the existing pedal driven vehicles are interconnected in a way which requires the pedals to always undergo their full vehicle propelling motion in unison but 180 degree out of phase. Each pedal is driven through each of its full power strokes by the vehicle user simultaneously with movement of the other pedal through its full return stroke. As a consequence, both legs of the user must always be used to operate the vehicles, and the user can exert a vehicle driving force against only one pedal at a time. Moreover, pedals mounted on a rotary crank have two diametrically opposed dead center positions relative to the position occupied by the vehicle user. If the pedals initially occupy these dead center positions when the vehicle is at rest, it is very difficult and often impossible to commence rotation of the pedals unless they are first moved in some way from such positions. This movement of the pedals from a dead center position is most difficult for those who have less agility or strength than average or who suffer from leg and various other orthopedic problems.

Other features of the existing pedal driven vehicles make these vehicles unsuitable for use as therapeutic exercise machines for exercising persons with certain leg, spinal, and other orthopedic problems. One such feature resides in the fact that the user leg extension and retraction movements and distances required to operate the vehicles are fixed by the fixed diameter of the circular path of pedals mounted on a rotary crank, such as bicycle pedals, and the fixed stroke length of reciprocatory pedals. In the case of bicycles, additional features which make them unsuitable for use by less agile persons and for exercising persons with many leg, spinal, and other therapeutic problems are balance, the location of the seat almost directly over the pedals, the generally upright position of the bicycle rider, and the generally vertical direction of the rider's leg movements. Such rider body orientation and leg motion are either not the most efficient for or are totally unsuitable for many orthopedic problems which can be effectively treated and alleviated by appropriate pedaling type exercises.

A variety of stationary exercise machines of the class defined by (a), (b), (c) above have also been devised.

Except for the "vehicle" characteristics or features of the user powered vehicles discussed above, the existing exercise machines of the class described are quite similar to such vehicles and possess many if not most of the other features just discussed. As a consequence, many if not all of these existing exercise machines are not suitable for the therapeutic exercise uses discussed above.

SUMMARY OF THE INVENTION

This invention provides an improved user powered machine of the character described which can be constructed and arranged to function as either or both a vehicular conveyance for the machine user and an exercise machine and which is devoid of the above discussed and other features of the existing machines of the same general class which limit or preclude their use for the therapeutic purposes mentioned. The user power machine of the invention has a body including a seat for the machine user, and a user powered machine drive system including user actuated means mounted on the body for movement in a certain machine driving motion by the user, rotary driven means, and unique mechanical power transmission means connecting the user actuated means and the driven means in such a way that movement of the user actuated means by the machine user drives the driven means in rotation.

Several presently preferred embodiments are disclosed. One embodiment is a wheeled vehicle whose driven means comprise at least one drive wheel which is rotated to propel the vehicle by movement of the user actuated means. A second embodiment is a marine vehicle or boat whose driven means comprise propellers which are driven in rotation to propel the boat through water by movement of the user actuated means. A third embodiment is a stationary exercise machine whose driven means is a rotor which is driven in rotation against the action of a resisting force exerted on the rotor.

In these preferred embodiments, the user actuated means comprise two user actuated members, specifically pedals, located forwardly of the machine seat and mounted for independent reciprocatory movement longitudinally of the machine by the machine user. The pedals of the particular embodiments described are mounted on carriages movable along linear guides or tracks extending longitudinally of the machine for independent linear reciprocatory movement of the pedals. Each pedal is drivably connected to the driven means by a mechanical power transmission in such a way that reciprocatory motion of each pedal by the action of the machine user drives the driven means in one direction of rotation (forward direction). Each transmission comprises a mechanical power train including a rotary driven shaft coupled to the driven means so that rotation of the shaft in one direction (forward direction), drives the driven means in its forward direction of rotation, a translator coupled to the shaft for movement in one direction (forward direction) to drive the driven shaft in its forward direction and in the opposite direction (return direction) relative to the driven shaft, and a force transmission member connecting the pedal and translator in a manner such that reciprocatory movement of the pedal by action of the machine user drives the translator in its forward and return directions alternately to drive the driven shaft and thereby the driven means in their forward directions of rotation.

One important feature of these preferred embodiments resides in the fact that the user actuated pedals are independently movable to drive the driven shaft. As a consequence, the pedals may be actuated in three different modes. These are (a) movement of the pedals in unison in opposite directions, (b) movement of the pedals in unison in the same direction, and (c) movement of either pedal by itself. This feature enables the machine operation to provide effective therapeutic exercise for certain orthopedic problems. Moreover, when the machines are not in use, the pedals always return to normal rear limiting positions from which the pedals are movable forwardly through full power strokes in such a way that the pedals never occupy dead center positions from which the pedals must be moved, as can occur in a bicycle, for example.

Another important feature of the preferred embodiments resides in the fact that the translator of each drive train is an oscillatory translator wheel rotatably mounted on the driven shaft and coupled to the shaft in a manner such that rotation of the wheel in its forward direction drives the shaft in its forward direction, and the wheel is rotatable in its return direction relative to the shaft. The force transmission member of each drive train is a cable which is trained about and disposed in driving engagement with the translator wheel. This cable is movable in one endwise direction against the force of a cable return spring to drive the translator wheel in its forward direction, and thereby the driven shaft and driven means in their forward directions, by forward movement of the respective pedal through its power stroke by the force of the machine user's foot against the pedal. The effective torque arm on which the force exerted on each pedal by the user acts to rotate the driven shaft remains relatively constant throughout each full forward power stroke of the pedal.

A further important feature of the preferred embodiments resides in the fact that the drive ratio of the mechanical power transmission which connects each pedal to the driven means is adjustable by the machine user. This variable ratio transmission includes a plurality of parallel drive trains having different effective drive ratios, and shift means positionable by the machine user for connecting the pedal to the respective translator through any one of these drive trains. This variable ratio transmission enables the user to operate the machine at various effort levels and velocities of leg motion in accordance with the physical ability of the user and/or the particular objectives the user wishes to achieve with the machine.

All of these and other later described features of the invention provide vehicular and stationary exercise machines whose operation provides not only healthy exercise for the average person but also an ideal exercise for certain orthopedic problems.

BRIEF DESCRIPTION OF THE DRAWINGS

FIG. 8 illustrates a stationary exercise machine according to the invention.

DESCRIPTION OF THE PREFERRED EMBODIMENT

Figures 1, 2:
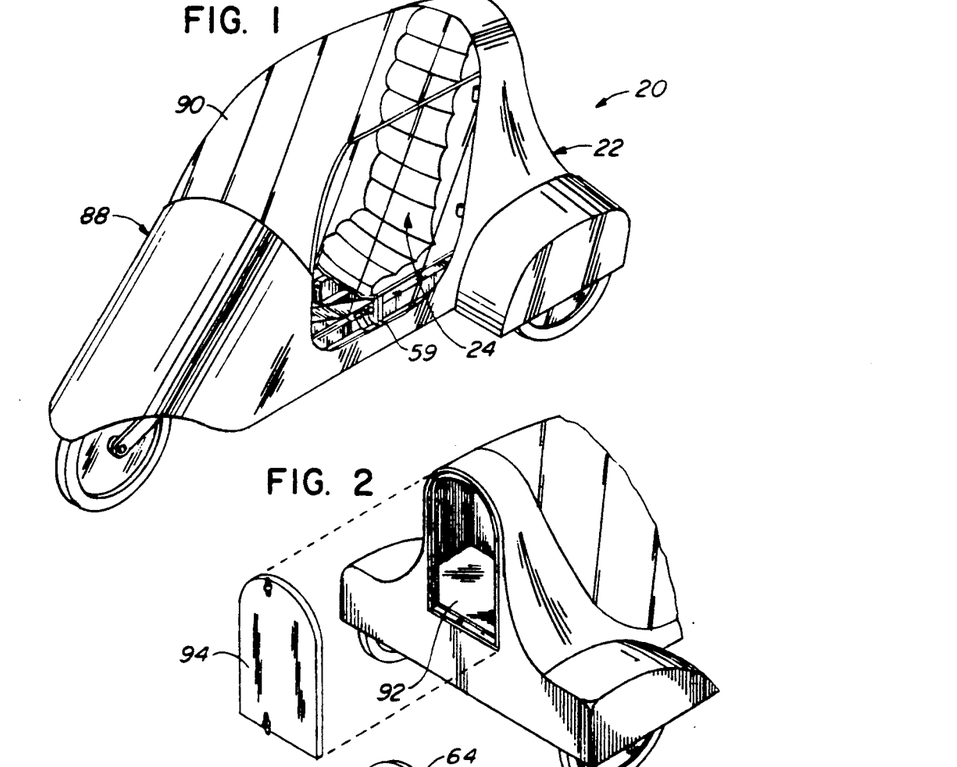
FIG. 1, is a perspective view of a user powered machine according to the invention which, in this case, is a three wheeled vehicular machine, i.e. vehicle.
FIG. 2 is a fragmentary perspective view of the rear of the vehicle illustrating a storage compartment in the vehicle.
Figure 3:
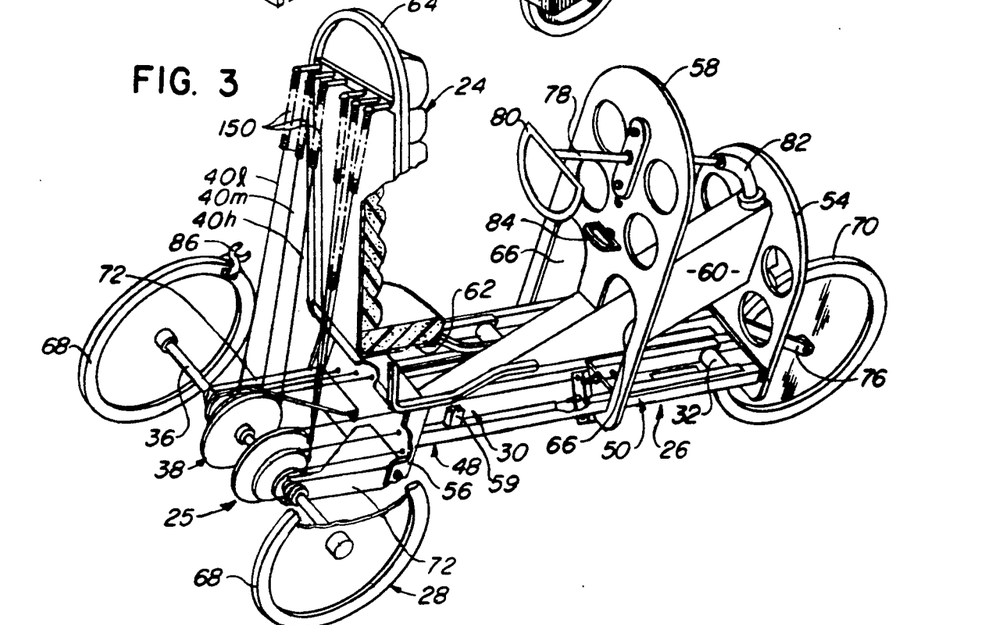
FIG. 3 is an enlarged perspective view of the vehicle with its body/shell removed to reveal certain inner operating parts of the vehicle.

Turn now to these drawings and first to FIGS. 1-14C, according to the invention. Considered in the broader context of the invention, the machine 20 comprises a body 22 including a seat 24 for the machine user and a drive system 25 to be powered by the machine user for operating or driving the machine. This machine drive system includes user actuated machine driving means 26 movable in a certain machine driving motion by the user, rotary driven means 28, and mechanical power transmission means 30 drivably connecting the user actuated means and the driven means in such a way that movement of the actuated means in its machine driving motion by the machine user drives the driven means 28 in one direction of rotation referred to herein as its forward direction. The user actuated means 26 include two user actuated machine driving members 32 located forwardly of the seat 24, that is to the right of the seat in FIGS. 3 and 4.

In the machine illustrated, the user actuated members 32 are pedals which are engagable by the user's feet and independently movable in a reciprocatory, machine driving motion by extension and retraction of the user's legs in the manner depicted in FIG. 4 and described in more detail later. Each pedal is movable through a right hand power stroke and a left hand return stroke in FIG. 4. The mechanical power transmission means 30 comprises two separate mechanical power transmissions 34 each drivably connecting one pedal 32 to the driven means 28. The driven means 28 can thus be driven in its forward direction of rotation by any one of the following reciprocatory pedal movements by the machine user: (a) movement of the pedals in unison in opposite directions, (b) movement of the pedals in unison in the same direction, and (c) movement of either pedal alone.

The mechanical power transmission 34 connecting each pedal to the driven means 28 comprises a driven shaft 36 coupled to the driven means so that rotation of the shaft in one direction, to herein as its forward direction, rotates the driven means in its forward direction. Drivably coupled to the shaft are translator means 38 which are movable in one direction, referred to as the forward direction, to drive the shaft in its forward direction of rotation. The translator means 38 are movable in the opposite direction, referred to herein as the return direction, relative to the shaft, that is without driving the shaft in the return direction. Force transmission means 40 drivably connect each pedal and its respective translator means 38 in such a way that reciprocatory movement of the pedal drives the translator means in the forward and return directions alternately to intermittently drive the shaft 36 and thereby the driven means 28 in their forward directions of rotation.

According to an important feature of the invention, each mechanical power transmission 34 is a variable ratio transmission including shift means 42 for varying the drive ratio of the transmission and thereby the level of effort and the rapidity of leg movement required to drive the driven means 28 at any given speed against any given resistance. This shift means comprises a plurality of parallel mechanical drive trains with different effective drive ratios, in this instance three drive trains designated 44*l*, 44*m*, 44*h* having relatively low, medium, and high drive ratios, respectively, and a shifter 46 which is positionable by the machine user to selectively drivably connect the respective pedal 32 to the driven shaft 36 through any one of the three drive trains so that reciprocatory movement of the pedal drives the driven means with the drive ratio of the connected drive train.

Each drive train 44*l*, 44*m*, 44*h* has a translator coupled to the driven shaft 36 and a force transmission member for connecting the translator to the shifter 46. Accordingly, each power transmission 34 has three translators, designated 38*l*, 38*m*, 38*h*, which together comprise its translator means 38 and three force transmission members, designated 40*l*, 40*m*, 40*h*, which are connected to the three translators, respectively, and together comprise the force transmission means 40 of the transmission. As explained in more detail presently, the shifter 46 of each transmission 34 is movable to three different positions to selectively connect any one of the three force transmission members 40*l*, 40*m*, 40*h* of the transmission to the respective pedal 32 in such a way that reciprocatory movement of the pedal moves the corresponding translator 38*l*, 38*m*, or 38*h*, as the case may be, in its forward and return directions alternately to drive the shaft 36 in its forward direction of rotation with the ratio of the connected drive train.

Referring now in more detail to the drawings, the particular user powered machine 20 illustrated in FIGS. 1-14C is a wheeled vehicular machine, i.e. a wheeled vehicle, and the machine drive system 25 is a user powered propulsion system for propelling the vehicle. The vehicle body 22 has a chassis frame 48 including two paris 50 of channels 52 extending longitudinally of the vehicle. The several channels are rigidly joined at their front ends by a bulkhead 54, at their rear ends by a peripherally flanged plate 56, and between their ends by a bulkhead 58 located a short distance forwardly of the seat 24. Seat 24 is supported on the rear plate 56 and a pair of front seat supports 59 rigidly attached to opposite sides of the frame 48. Between the channel pairs 50 is a box beam 60 which extends upwardly and forwardly, at an angle relative to the channels 52, from the rear plate 56, through the center bulkhead 58 to the front bulkhead 54. This beam is welded or otherwise rigidly joined to the rear plate, bulkheads, and the adjacent inner channels. The seat 24 has a cushioned rigid frame including a seat portion 62 which is welded or otherwise rigidly secured to the upper flange of the rear plate 56 and the front seat supports 59 and an upstanding back portion 64. The rear bulkhead 58 has openings 66 at opposite sides of the beam 60 through which the vehicle user extends his legs to engage the pedals, as explained later.

The vehicle 20 has two rear wheels 68 and a single front steerable wheel 70. The two rear wheels are drive wheels which together comprise the driven means 28 referred to earlier and are fixed on the ends of the driven shaft 36 for forward rotation with the shaft to propel the vehicle forwardly. This driven shaft extends through the rear ends of and is rotatably supported by two arms 72 of the vehicle frame 48 which extend rearwardly from and are welded or otherwise rigidly joined to side edge flanges of the rear chassis frame plate 56. The driven shaft is located a distance behind the back frame portion 64 of the seat 24.

The front wheel 70 i journaled on the lower end of a front wheel fork 76 having an upper journal (not shown) which is rotatably supported in the front end of the chassis frame beam 60 to permit steering of the front wheel. Rotatably supported in the rear bulkhead 58 is a steering shaft 78 which mounts a steering wheel 80 and is drivably connected by a flexible coupling 82 or the like to the upper end of the front wheel fork journal to permit the front wheel 70 to be steered by turning the steering wheel 80. Also mounted on the rear bulkhead 58 is a brake handle 84 which is connected by a cable not shown to rear wheel brake means, illustrated in fragmentary fashion at 86, for braking the vehicle by pulling on the handle.

Mounted on the chassis frame 48 is a body shell 88 including a transparent, combined top and windshield portion 90. The shell is open at its sides to permit a person to easily get into and out of the vehicle. At the rear of the shell is a storage compartment 92 to which access is provided by a removable closure 94.

The user actuated pedals 32 are cylindrical pedals mounted on the front ends of elongate pedal carriages 96. These pedal carriages are supported on the pairs 50 of chassis frame channels 52, respectively, for reciprocatory movement of the carriages and pedals along the channels, longitudinally of the vehicle. To this end, the channels 52 of each channel pair 50 open inwardly toward one another, as shown best in FIGS. 5 and 8-10. Each pedal carriage 96 comprises an upwardly opening channel-shaped body 98 positioned between the respective frame channels 52. Mounted on the outer sides of the carriage body side walls 100 are rollers 102 which turn on horizontal axes and engage the frame channel flanges 104 to support the pedal carriage vertically and rollers 106 which turn on vertical axes and engage the frame channel webs 108 to support the pedal carriage laterally.

At the rear end of each pedal carriage 96 is the shifter 46 of the respective mechanical power transmission 34. This shifter comprises a generally channel shaped housing 110 which is rigidly secured to the rear end of the carriage body 98 with the longitudinal axis of the housing disposed at about a 45 degree angle to the vertical in a transverse plane of the vehicle, as shown best in FIG. 10. Rotatable relative to this housing is a transmission ratio selector 112. Ratio selector includes a tube 114 rotatably confined within the housing and a lever 116 fixed to and extending radially from the tube through a slot 117 in the upper side of the housing for angularly adjusting the ratio selector about the axis of the selector tube 114. In the rear wall of the selector housing 110, at positions spaced axially of the selector tube 114, are three holes 118*l* 118*m*, 118*h* associated with the three drive trains 44*l* 44*m*, 44*h*, respectively, of the corresponding transmission 34. In the wall of the selector tube 114 at axially spaced positions corresponding to the positions of the selector housing holes 118*l*, 118*m*, 118*h* are three keyhole-like slots 120*l*, 120*m*, 120*h* extending circumferentially of the tube. Each slot has two enlargements 122, 124 spaced along the slot.

Referring now particularly to FIGS. 5, 6, 13 and 14A-14C, each translator 38*l*, 38*m*, 38*h* of each power transmission 34 is an oscillatory translator wheel which is rotatable in the forward and return translator directions mentioned earlier. Each translator wheel includes two spaced coaxial discs 126 rigidly joined by a number of shafts 128 spaced uniformly about and radially outward from the wheel axis. The two discs include coaxial bearings 129, such as ball bearings, which rotatably support the wheel on the driven shaft 36. Rotatably supported on each shaft 128 in the space between the discs 126 is a roller 130.

Figure 13:
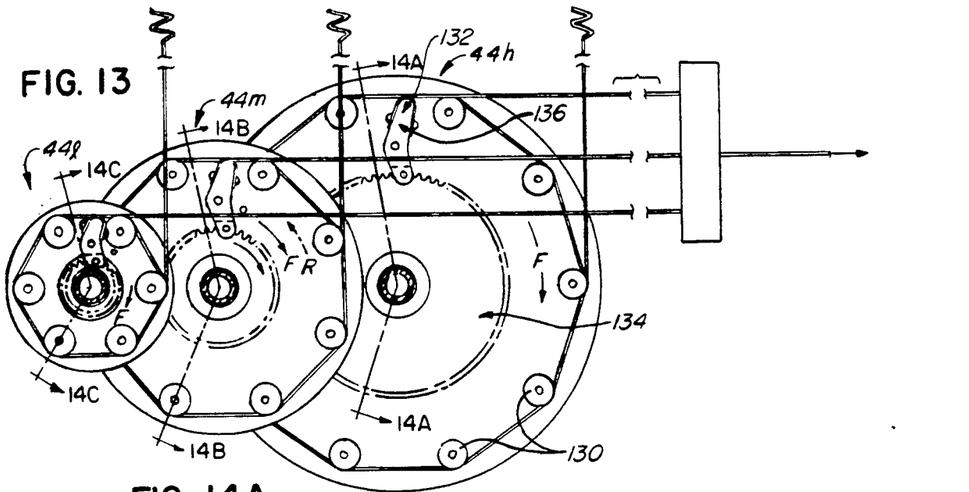
FIG. 13 is a semi-diagrammatic view in side elevation of certain translator wheels embodied in the mechanical power transmission of FIG. 5.
Figures 14A, 14B:
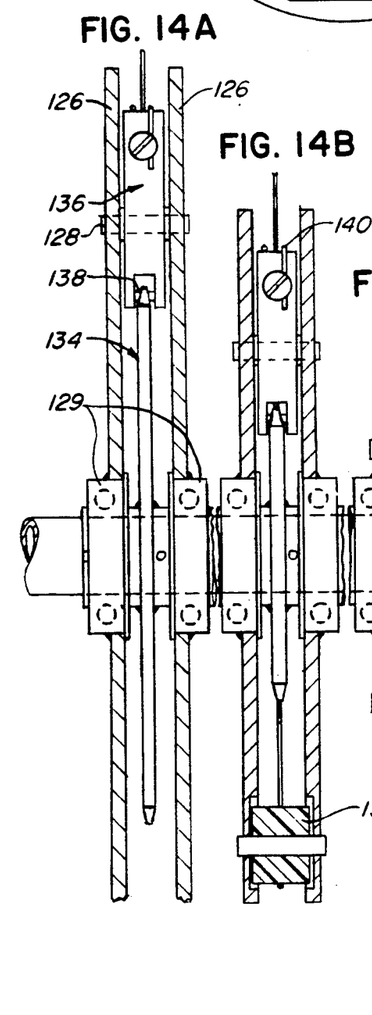
FIG. 14A is a section taken on line 14A—14A in FIG. 13.
FIG. 14B is a section taken on line 14B—14B in FIG. 13.
Figure 14C:
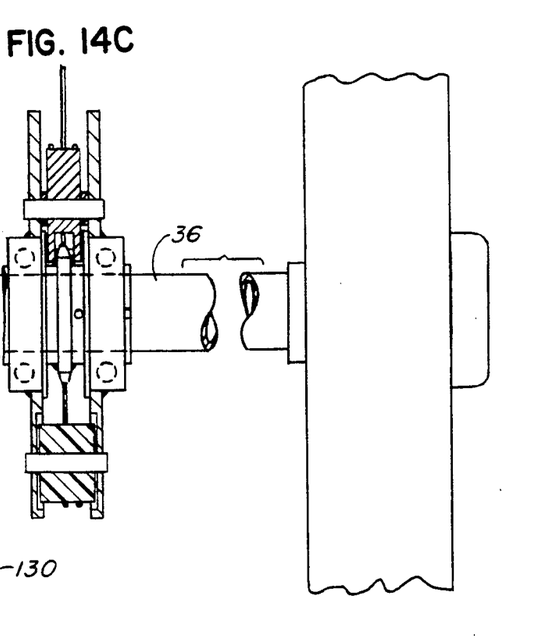
FIG. 14C is a section taken on line 14C—14C in FIG. 13.

Each translator wheel 38*l*, 38*m*, 38*h* is coupled to the driven shaft 36 by a one-way drive means 132 in such a way that rotation of the translator wheel in its forward direction (clockwise direction F in FIG. 13) drives the shaft in its forward direction (clockwise direction in FIG. 13). The drive means illustrated is a ratchet-like device including a toothed drive wheel 134 fixed to the shaft 36 between the translator wheel discs 126, and a spring loaded pawl 136 located between and pivotally mounted between its ends on the translator wheel discs. The radially inner end of the pawl is slotted and carries a pin 138 engaging the toothed edge of the drive wheel 134. The pawl spring 140 acts between a translator wheel disc 126 and the pawl 126 to urge the pawl pin 138 into contact with the drive wheel. The one-way drive means 132 of each translator wheel is arranged to drive the driven shaft 36 in its forward direction F of rotation upon rotation of the wheel in this direction and to permit reverse rotation of the translator wheel in its return direction R relative to the shaft. Accordingly, oscillatory motion of each translator wheel intermittently drives the driven shaft and thereby the vehicle drive wheels 68 in forward rotation to propel the vehicle 20.

Each force transmission member 40*l*, 40*m*, 40*h* is a cable which is trained about and disposed in driving engagement with its corresponding translator wheel 38*l*, 38*m*, or 38*h*. As explained below, each cable is attached at one end to a pedal carriage 96 and at the other end to a spring so that forward movement of the carriage pulls the cable forwardly and the spring returns the cable and carriage rearwardly. Each cable encircles its translator wheel between its side discs 126 and engages the wheel rollers 130 in the manner illustrated in FIG. 13. This manner of engagement of each cable with its translator wheel effectively drivably couples the cable to the wheel in a manner such that endwise movement of the cable drives the wheel in rotation. The three translator wheels 38l, 38m, 38h of each transmission 34 have three different effective diameters. Thus, the translator wheel 38l has the smallest effective diameter, the translator wheel 38h has the largest effective diameter, and the translator wheel 38m has an effective diameter about midway between the largest and smallest diameters. Accordingly, a given endwise force on the cable 40l in a direction to rotate the translator wheel 38l in its forward direction produces a given torque on the driven shaft 36. The same force in the same direction on the cable 40m produces a larger torque on the shaft, and the same force in the same direction on the cable 40h produces the greatest torque on the shaft. The translator wheels 38l, 38m, and 38h thus provide relatively low, medium, and relatively high drive ratios, respectively.

One end (front end) of each cable 40l, 40m, 40h extends forwardly from its translator wheel and through holes 142 in the rear seat supporting plate 56. Firmly attached to the front end of each cable is a coupler 144. This coupler has a stem 145, a coupling ball 146 at the front end of the stem, a reduced neck 147 between the ball and stem, and a flat shoulder 148 about the stem between this neck and the rear end of stem. The rear end of the coupler stem is sized to fit quite closely but removably within the corresponding cable hole 142 in the rear seat support plate 56. The opposite, rear end of each cable extends upwardly from its translator wheel behind the seat 24 and is attached at its upper end by a spring 150 to the back frame portion 64 of the seat.

Figures 5, 6:
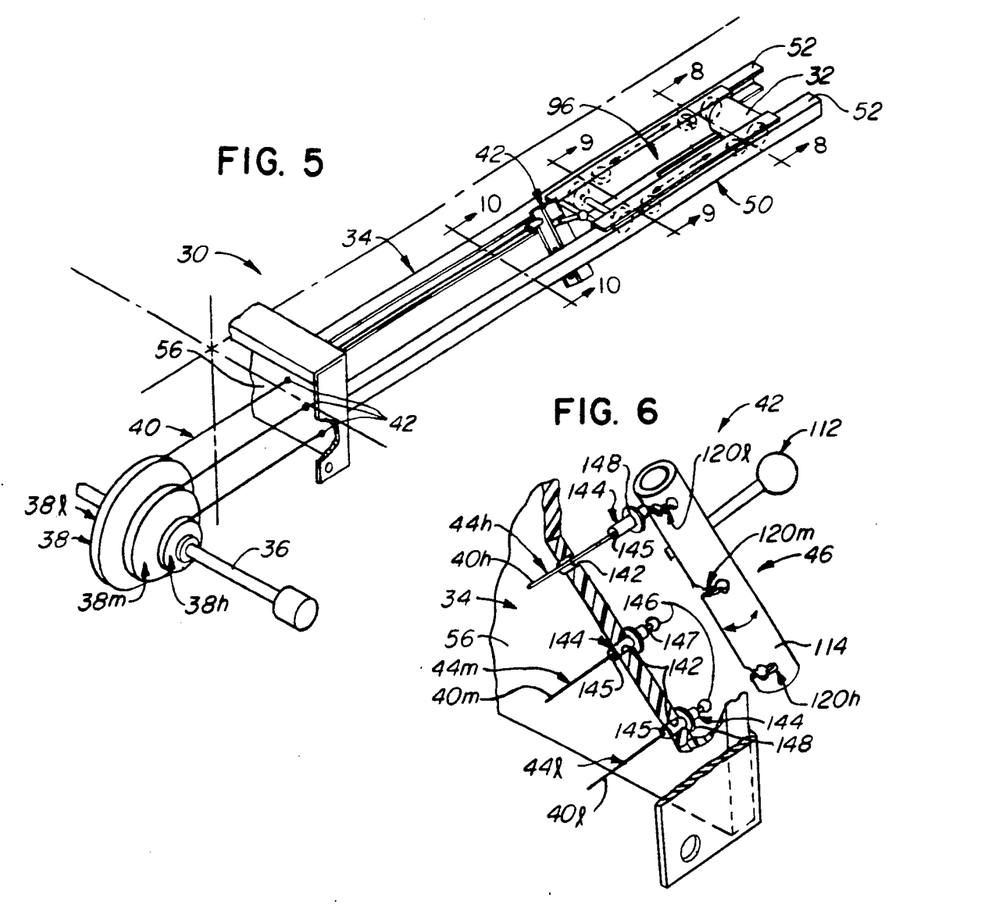
FIG. 5 is a fragmentary perspective view of a mechanical power transmission embodied in the vehicle.
FIG. 6 is an enlarged fragmentary perspective view of a drive ratio selecting shift device included in the transmission of FIG. 5.
Figure 7:
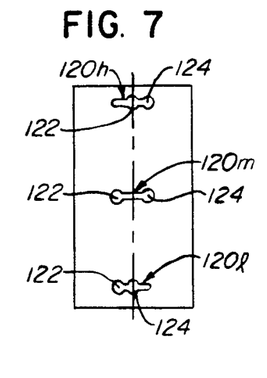
FIG. 7 is a flat development of a shifter of the shift device in FIG. 6.
Figure 8:
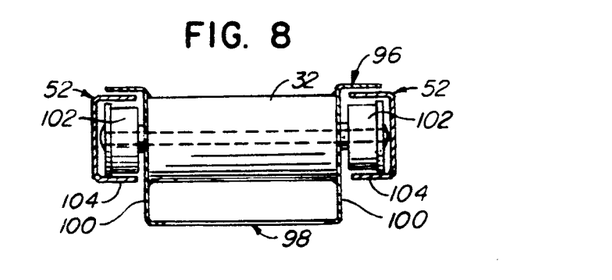
FIG. 8 is an enlarged section taken on line 8—8 in FIG. 5.
Figure 9:
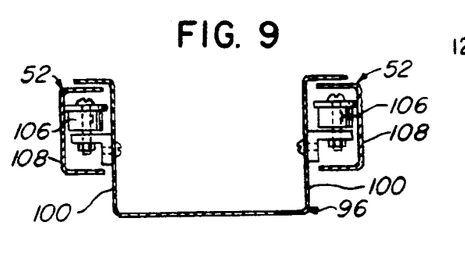
FIG. 9 is an enlarged section taken on line 9—9 in FIG. 5.
Figure 10:
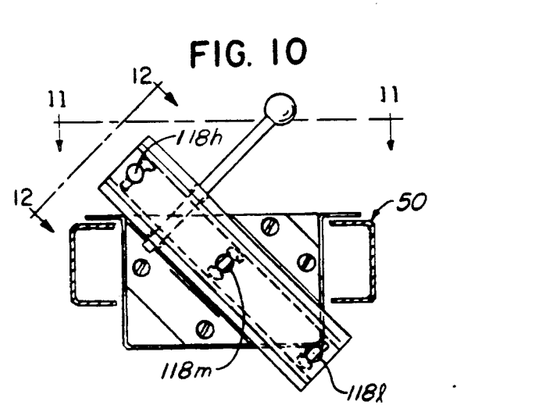
FIG. 10 is an enlarged section taken on line 10—10 in FIG. 5 looking at the rear end of a pedal carriage embodied in the machine.
Figure 11:
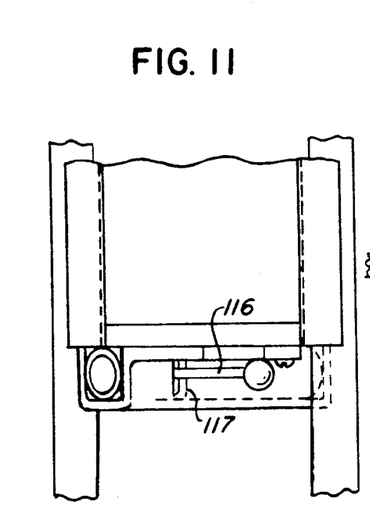
FIG. 11 is a view looking in the direction of the arrows 11—11 in FIG. 10.

Each spring 150 urges its cable 40l, 40m, or 40h, as the case may be, endwise in a direction which is referred to herein as a rearward direction and normally retains the cable in a rear retracted position like those occupied by the two lower cables 40m and 40h in FIG. 6. In these normal retracted cable positions, the rear ends of the stems 145 of the cable couplers 144 enter the corresponding cable holes 142 in the rear seat support plate 56, and the coupler shoulders 148 seat flat against the front side of this plate to locate the couplers in certain fixed positions relative to the direction lines of reciprocatory movement of their corresponding pedal carriages 96. The cable couplers are then aligned, on axes which parallel these direction lines, with the holes 118l, 118m, 118h in the selector housings 110 of the corresponding transmission shifters 46.

Each transmission ratio selector 112 is rotatable in its housing 110 to low, medium, and high drive ratio positions. In each selector position, one enlargement 122 or 124 of one selector slot 120l, 120m, or 120h and one enlargement of a second selector slot are aligned with their corresponding selector housing holes 118l, 118m, 118h. A narrow portion of the remaining selector slot is aligned with its corresponding selector housing hole. In the low ratio position of each selector, for example, the narrow right hand end (as viewed in FIG. 7) of its slot 120l is aligned with the selector housing hole 118l, and enlargements 124 of the selector slots 120m, 120h are aligned with the selector housing holes 118m, 118h, respectively. In the medium ratio position of each selector, the narrow center portion of its slot 120m is aligned with the selector housing hole 118m and enlargement 124 cf selector slot 120l and enlargement 122 of selector slot 120h are aligned with the selector housing holes 118l, 118h, respectively. Finally, in the high ratio position of each selector, the narrow left hand end of its slot 120h is aligned with selector housing hole 118h, and the enlargements 122 of selector slots 120l, 120m are aligned with the selector housing holes 118l, 118m, respectively.

The selector housing holes 118l, 118m, 118h and the selector slot enlargements 122, 124 are slightly larger in diameter than the front coupling balls 146 of the couplers 144. The width of the relatively narrow selector slot portions beyond their slot enlargements 122, 124 is slightly greater than the diameter of the coupler necks 147 but smaller than the coupling ball diameters. The diameter of the coupler stems 145 is approximately the same as the diameter of the coupling balls 146. The axial dimension of the coupler necks 147 is slightly greater than the wall thickness of the ratio selector tubes 114.

Each transmission shifter 46 is adjustable to secure its respective pedal carriage 96 to any one of the three corresponding transmission cables 40l, 40m, 40h. In this regard, it will be evident from the above description of the shifter that in each ratio selecting position of its transmission ratio selector 112, two of the selector slots 120l, 120m, 120h are positioned so that one enlarged portion 122 or 124 of each slot is aligned with its corresponding selector housing hole 118l, 118m, or 118h, and a narrow portion of the remaining slot is aligned with its selector housing hole. These aligned selector slot portions and selector housing holes form shifter coupling sockets designated as 154l, 154m, 154h, respectively, which are aligned with the corresponding cable couplers 144 on axes parallel to the direction line of reciprocatory movement of the corresponding pedal carriage 96 when these cable couplers occupy their rearwardly retracted positions of FIGS. 6, 12, and 12A.

A coupling socket 154l, 154m, 154h formed by a selector slot enlargement 122 or 124 and a selector housing hole 118l, 118m, 118h is referred to herein as an unlocked coupling socket into which the corresponding cable coupler 144 may freely enter axially to an unlocked coupling position and from which the coupler may freely withdraw. The two lower coupling sockets 154m, 154l and the corresponding cable couplers 144 in FIG. 12A are shown in these unlocked configurations. A coupling socket formed by an aligned narrow selector slot portion and selector housing hole is referred to as a locked coupling socket wherein the edges of the aligned narrow selector slot portion are located to straddle the reduced neck 147 of the corresponding cable coupler positioned in the socket and thereby secure the coupler in a locked coupling position within the socket. The upper coupling socket 154h and cable coupler 144 in FIG. 12A are shown in these locked configurations.

Rotation of the ratio selector 112 of each transmission shifter 46 from each of its ratio selecting positions to another unlocks its currently locked coupling socket and locks one or the other of its currently unlocked coupling sockets. When the selector 112 in FIG. 12 occupies its low ratio position $P_l$ in FIG. 12, for example, the shifter coupling sockets 154h, 154m are unlocked and coupling socket 154l is locked. When the selector occupies its intermediate ratio position $P_m$, sockets 154h and 154l are unlocked and socket 154m is locked. Finally, when the selector occupies its high ratio position $P_h$, illustrated in FIG. 12A, sockets 154l and 154m are unlocked and socket 154h is locked. As explained below, each transmission ratio selector 112 is thus positionable by the vehicle user to connect the corresponding pedal carriage 96 to any one of its respective transmission cables and through the connected cable, to the corresponding translator wheel 44l, 44m, or 44h, thereby to vary the drive ratio of the corresponding transmission 34.

Figure 12:
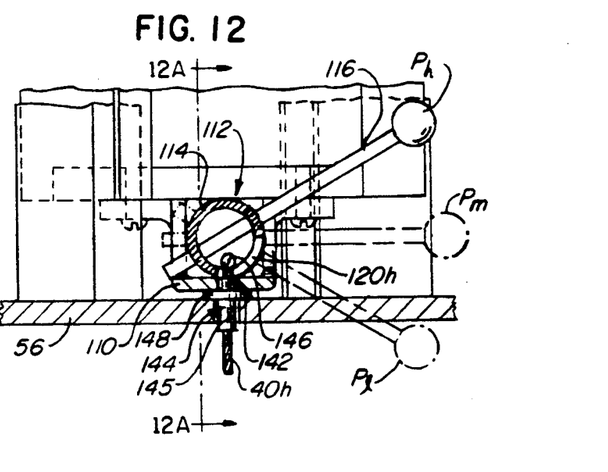
FIG. 12 is a view, partly in section, looking in the direction of the arrows 12—12 in FIG. 10 showing the pedal carriage in its rear limiting position against a rear carriage limit stop.
Figure 12A:
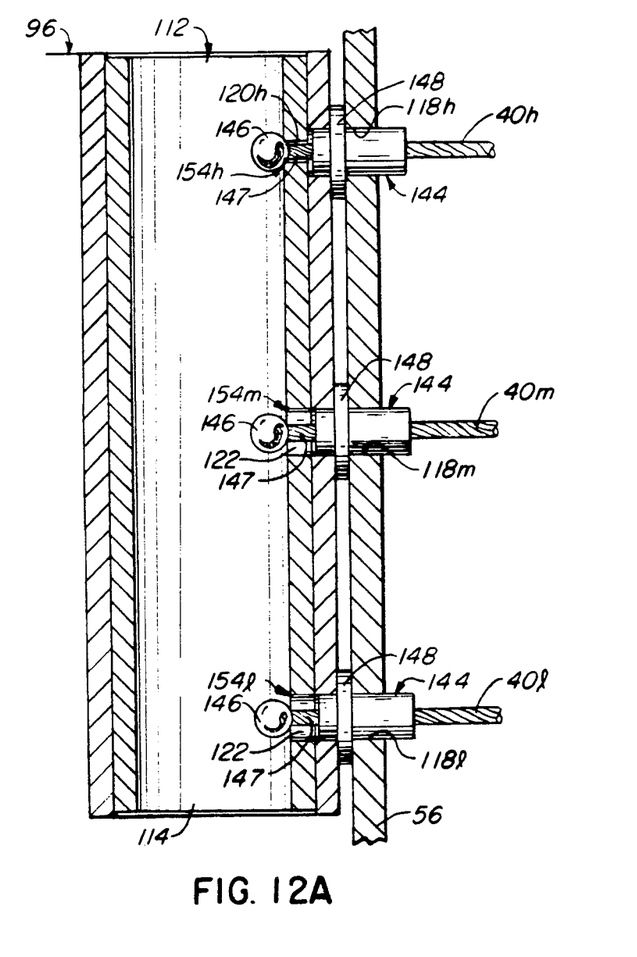
FIG. 12A is a section taken on line 12A—12A in FIG. 12

Each transmission 34 is initially assembled by positioning the corresponding pedal carriage 96 a distance forwardly of its rear limiting position of FIGS. 12 and 2A, in order to space the transmission shifter 46 on the carriage from its respective cable couplers 144 which are then in their rear retracted positions. The drive ratio selector 112 of the shifter is rotated to any one of its ratio selecting positions wherein two of its coupling sockets 154l, 154m, 154h are unlocked and the remaining socket is locked. Either of the transmission cable couplers 144 aligned with the two unlocked coupling sockets is then connected to the transmission shifter. This can be accomplished by pulling the corresponding cable 40l, 40m, or 40h, as the case may be, forwardly toward the shifter 46, either against the force of, or by detaching the cable spring 150, then inserting the respective cable coupler into its aligned shifter coupling socket, and finally rotating the ratio selector to either of its other ratio selecting positions to lock the cable to the shifter. The two remaining coupling sockets are then unlocked.

At this point, then, one cable 40l, 40m, or 40h of each transmission 34 will be connected to the corresponding pedal carriage 96 like the cable 40h in FIGS. 6 and 12A. The two remaining cables of the transmission are retained by their springs 150 in their rear retracted positions like the cables 40m, 40l in FIGS. 6 and 12A. The spring 150 attached to the connected cable, that is the cable which is then connected to the pedal carriage, urges the carriage rearwardly toward its rear limiting position of FIGS. 12, and 12A, wherein all three cables occupy their rear retracted positions, and the front wall of the shifter housing 110 on the carriage seats against the front sides of the coupler shoulders 148 which are then held by spring force against the front side of the rear seat support plate 56. As the pedal carriage approaches this rear limiting position, the couplers 144 on the two currently retracted cables enter the then unlocked shifter coupling sockets, i.e. sockets 154m, 154l in FIGS. 6 and 12A.

In this latter regard, it will be observed in FIGS. 6 and 12A that the cable couplers 144, when in their rear retracted positions, are precisely located laterally by their respective rear seat support plate holes 142 and axially by their shoulders 148 to enter their respective unlocked shifter coupling sockets to their unlocked coupling positions. Each shifter ratio selector 112 is then freely rotatable to any one of its ratio selecting positions to selectively lock the shifter to any one of the corresponding cable couplers and thereby connect the pedal carriage to the corresponding translator wheel 38l, 38m, or 38h through the respective transmission cable 40l, 40m, or 40h. The handles 116 of the shifter ratio selectors 112 are readily accessible to the vehicle user through the illustrated open spaces below the seat at opposite sides of the vehicle when the pedal carriages occupy their rear limiting positions to permit the user to easily rotate the selectors to their various ratio selecting positions. The ratio selectors are thus adjusted by the user only when the pedal carriages are in their rear limiting positions so that each carriage is always connected to one, and only one, transmission cable. The carriages are normally retained in their rear limiting positions by the springs 150 attached to the cables which are currently connected to the carriages.

Operation of the user powered vehicle 20 is obvious from the foregoing description. The vehicle user sits on the seat 24 with his feet engaging the pedals 32 through the rear bulkhead openings 66. The user positions the drive ratio selectors 112 of the transmission shifters 46 in the same initial drive ratio settings while the pedal carriages 96 are in their rear limiting positions. Normally, these initial selector positions will be their high ratio positions $P_h$ wherein the pedals, or more specifically their carriages 96, are connected through the transmission cables 40h to the largest diameter translator wheels 38h which together constitute the highest drive ratio drive trains of the transmissions 34. The user then propels the vehicle by alternately pushing the pedals forwardly through their power strokes and releasing the pedals for return by the springs attached to the cables currently connected to the pedals so as to effect reciprocatory movement of the pedals. This reciprocatory pedal movement oscillates the translator wheels 38h in their forward and return directions to drive the driven shaft 36 and thereby the vehicle drive wheels 68 in their forward directions of rotation and thus produce a forward propelling or driving force on the vehicle.

A unique advantage of the invention resides in the fact that (a) the pedals 32 normally occupy their rear limiting positions when the vehicle is not in use so that the pedals are always initially positioned for forward movement through their full power strokes, and (b) the effective torque arm on which the force exerted by the user on each pedal acts through the currently connected transmission cable to rotate the driven shaft 36 remains relatively constant throughout the full power stroke. Accordingly, the necessity of initially positioning the pedals by hand or by wheeling the vehicle as is often necessary with a bicycle to rotate the bicycle pedals from a dead center position is avoided in the present vehicles.

The initial high drive ratio setting of the transmission shifter selectors 112 permits propulsion of the vehicle from a standstill with the least effort, i.e. least force on the pedals. As the vehicle speed increases, the user can shift the transmissions 34 through their intermediate drive ratios to their lowest drive ratios by rotating the ratio selectors 112 first to their intermediate ratio positions $P_m$, wherein the pedals are connected to the intermediate diameter translator wheels 38m, and then to their lowest ratio positions $P_l$, wherein the pedals are connected to the smallest diameter translator wheels 38l. As mentioned above, the selectors are thus rotated or shifted only while their respective pedals 32 and pedal carriages 96 are in their rear limiting positions.

It is evident that the pedals 32 can be actuated by the vehicle user in the three different vehicle operating modes. Thus, the pedals can be reciprocated in unison but in opposite directions so that each pedal undergoes its forward power stroke while the other pedal undergoes its rearward return stoke. This operating mode produces a relatively continuous driving force on the vehicle but by the thrust of only one leg of the user at a time. Alternatively, the pedals can be reciprocated in unison in the same direction so that the two pedals undergo their power and return strokes simultaneously. The driving force on the vehicle is then intermittent but produced by the combined thrust of both legs and hence is larger than the driving force produced by the first operating mode. Finally, either pedal can be reciprocated by itself which results in an intermittent driving force on the vehicle of about the same magnitude as that produced by the first operating mode.

Figure 15:
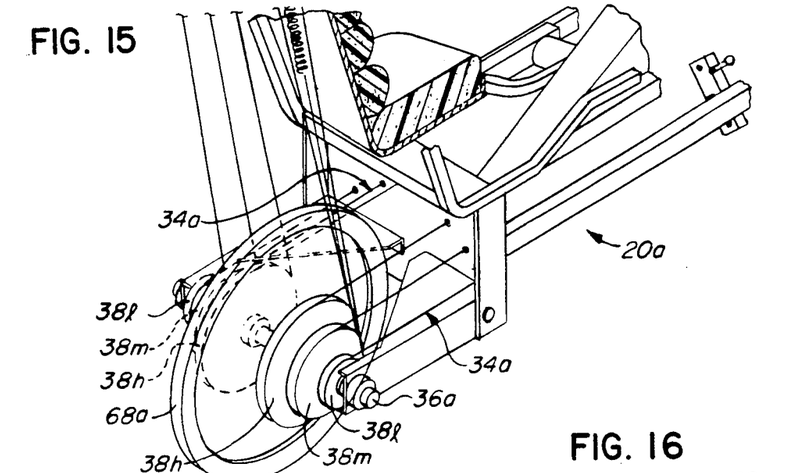
FIG. 15 is a fragmentary perspective view of a two wheeled vehicular machine according to the invention.

Referring now to FIG. 15, there is illustrated a two wheel vehicle 20a according to the invention. This two wheel vehicle is identical to the three wheel vehicle 20 described above except in the following respects. Vehicle 20a has a single rear drive wheel fixed on a rear driven shaft 36a at the center of the shaft. The translator wheels 38l, 38m, 38h of the two vehicle transmissions 34a are located at opposite sides of the rear wheel. The operation of the two wheel vehicle is identical to that of the earlier three wheel vehicle except, of course, that the two wheel vehicle must be balanced on its two wheels like a bicycle. No further description of the two wheel vehicle is thus necessary.

Figure 16:
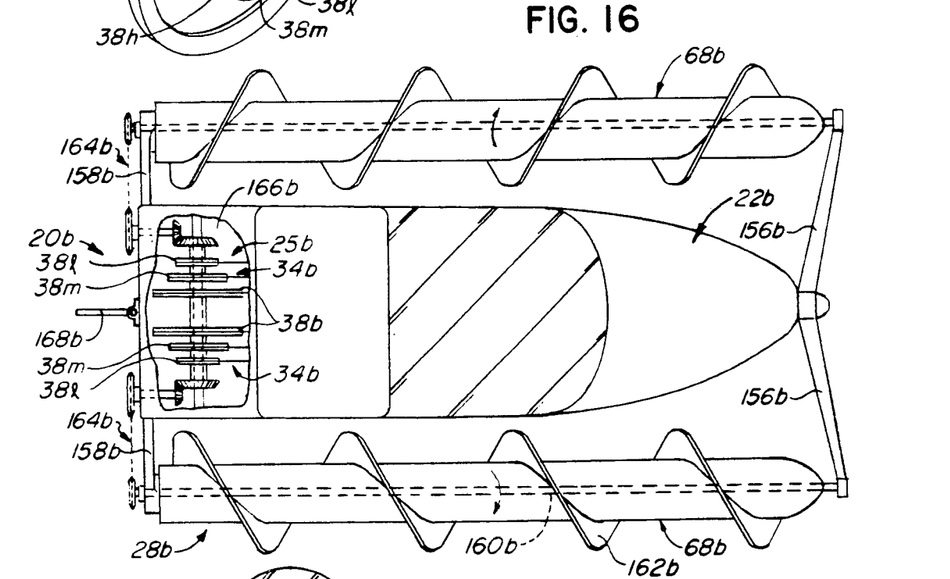
FIG. 16 is a top plan view of a marine vehicle according to the invention.
Figure 17:
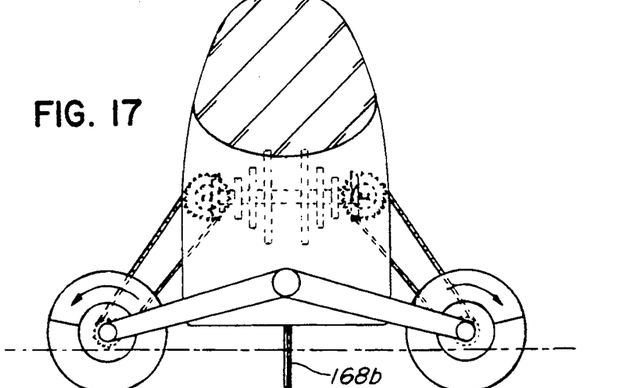
FIG. 17 is a front end view of the marine vehicle in FIG. 16.

The user powered marine vehicle or boat 20b of FIGS. 16 and 17 is similar to the earlier described wheeled vehicle 20 but is designed for use in the water rather than on land. The body 22b of the vehicle 20b has a generally boat shape rather than the vehicle shape of the earlier vehicle body. The wheels of the earlier vehicle are replaced, in the boat, by two hollow elongate, generally cylindrical floats 68b which extend longitudinally of the body 22b at opposite sides of the slightly below the body. Fixed to and extending laterally to each side of the body 22b at the front and rear ends of the body are float supporting arms 156b, 158b which straddle the floats 68b endwise. The floats have central shafts 160b which are fixed to the floats and are journaled at their ends in the adjacent arms 156b, 158b to rotatably support the floats for rotation on their longitudinal axes. Extending about the floats are helical vanes 162b which serve to propel the boat through water when the floats are rotated in the manner explained below. Accordingly the floats form, and are hereafter referred to in places as, propellers which constitute the driven means 28b of the boat.

The combined buoyancy of the floats 68b is made sufficient to support the boat, when occupied by a user, with the body riding on or located slightly above the water surface and with the floats at least partially submerged below, the water surface to a depth such that rotation of the floats produces a propelling force on the boat. If necessary, the boat body may also be buoyant.

The boat has a propeller drive system 25b which is identical to the drive system 25 of the wheeled vehicle 20 except that the driven shaft 36b of the boat, rather than being directly connected to the driven means, i.e. propellers 68b, as in the wheeled vehicle, is drivably connected to the propellers by bevel gear and chain drives 164b. The driven shaft 36b and the translator wheels 38l, 38m, 38h of the drive system transmissions 34b are enclosed within a rear compartment 166b at the rear of the body 22b. It will be understood, therefore, that reciprocation of the drive system pedals (not shown) by the boat user in the manner described earlier drives the two propellers 68b in rotation in directions to propel the boat forwardly. The steering wheel (not shown) of the boat is connected to a rudder 168b rotatable by the steering wheel to steer the boat.

Figure 18:
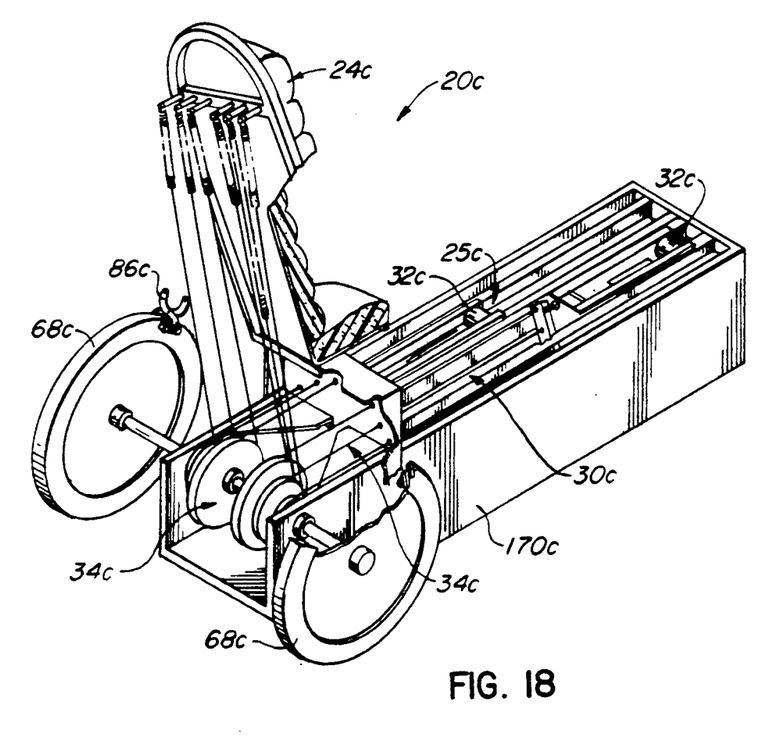

Turning now to FIG. 18 there is illustrated a stationary exercise machine 20c according to the invention. This exercise machine has a frame 30c identical to the chassis frame of the earlier described vehicle 20 but mounted on a base 170c which rests on the floor rather than on wheels as does the vehicle chassis. On the frame 30c is a seat 24c for the machine user and a user actuated drive system 25c, identical to the user powered drive system 25 of the vehicle 20, for driving rotary driven means 28c. This driven means comprises a rotor 68c engaged by an adjustable friction brake 86c for resisting rotation of the rotor. The drive system pedals 32c are reciprocated by the user in the same manner as the pedals of vehicle 20 to drive the rotor 68c through two variable ratio transmissions 34c that are adjustable by the user in the same manner as the transmissions 34 of the vehicle to vary the drive ratios between the pedals and the rotor.

Operation of the exercise machine is essentially identical to that of the earlier user powered vehicle 20. The only difference between the two operations is that reciprocation of the exercise machine pedals 32c drives the brake rotor 68c and is resisted by the friction brake 86c rather than driving wheels and being resisted by gravity, wind resistance, inertia, etc, as in the vehicle.

As mentioned earlier, operation of the vehicles and stationary exercise machines of the invention provide therapeutic exercises for certain leg, spinal, and other orthopedic problems. In this regard, it will be recalled from the earlier description that when the machines are not in use, their pedals are always situated in their rear limiting positions so that initial forward movement of the pedals by a machine user occurs through their full power strokes and produces forces which act on relatively constant torque arms throughout these strokes to drive the driven shaft. During this operation of the machines, the angle between a line connecting each pedal and the corresponding knee joint of the user and a line connecting the pedal and the corresponding hip joint of the user varies between the two extremes designated $a_1$ and $a_2$ in FIG. 4. According to the invention, the present machines are designed so that the leg movements which occur during operation of the machine and are depicted in FIG. 4 provide effective therapeutic exercises for certain leg, spinal, and other orthopedic problems.

Figure 4:
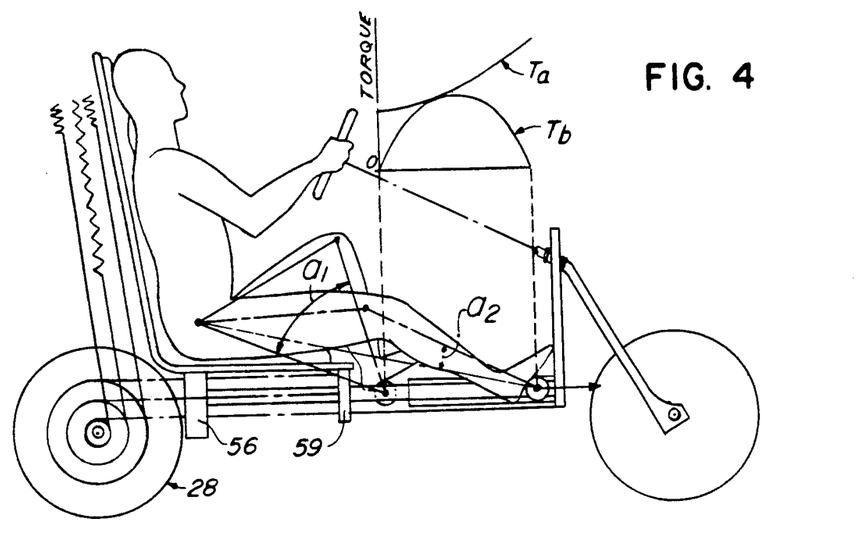
FIG. 4 is a diagrammatic illustration of the vehicle in side elevation depicting certain operating characteristics of the vehicle, whereby its operation provides an effective therapeutic exercise for persons with various leg, spinal, and other orthopedic problems.

The diagram in FIG. 4 compares the driving torque $T_a$ produced on the driven shaft of the reciprocatory pedal drive system used in the present operator powered machine with the driving torque $T_b$ produced on the driven shaft of a rotary pedal drive system, such as that of a conventional bicycle. The pedaling motion of the operator's legs and the resulting driving action of the operator's feet against the pedals in these two type drive systems are quite similar even though in some cases the leg motions in one system may be generally horizontal, as in the illustrated operator powered machines of the invention, and in the other type of system the leg motions may be generally vertical, as in a bicycle. In each type of system, however, the upper thigh portion and lower calf portion of each leg of the operator form a toggle-like system which is hinged at the knee and acts between a fixed pivot point at one end (the hip joint of the leg) and a movable object at the other end (a pedal). During each propulsion stroke of the operator, he exerts on this "toggle" a force which effectively acts at the knee joint to actuate the toggle from an initial position to a final position. In the initial position of the toggle a first line joining the pedal and any joint and a second line joining the pedal and hip joint form a relatively large included angle (represented by angle $a_1$ in FIG. 4). In the final position of the toggle, the above lines form a much smaller included angle (represented by angle $a_2$ in FIG. 4). In the operator powered machines of this invention, angle $a_1$ in FIG. 4 may be on the order of 45°, and angle $a_2$ may be on the order of 10°.

During each such propulsion stroke, the thrust of the operator's foot against the pedal produces a resultant force on the pedal in the direction of pedal movement which drives the pedal through the forward half of its cyclic motion. The pedal is then returned through the remaining half of its cyclic motion by another force. This return force is a spring force in the case of the present reciprocatory pedal drive system. The return force in a rotary pedal drive system is the force exerted by the operator on the opposite pedal. The resultant force thus produced on each pedal of an operator powered machine according to this invention in the direction of pedal movement (FIG. 4) increases progressively during each power stroke in accordance with the relationship:

$$\frac{\cos a}{2 \sin a}$$

where a is the included angle between the above lines joining the pedal and knee joint and the pedal and hip joint. The force produced on the pedal of a rotary pedal drive system during each power stroke varies in accordance with a somewhat similar relationship.

The present reciprocatory pedal drive system and rotary pedal drive system, as explained thus far, are quite similar. The present reciprocatory pedal drive system, however, has a significant advantage over a rotary pedal drive system. This advantage resides in the fact that the resultant force in FIG. 4 on each pedal (in any seating of the shaft means of the drive system) acts on a fixed torque arm which is the effective radius of the corresponding drive wheel. As a consequence, during each power stroke, there is produced on the driven shaft a driving torque which is relatively large at the start of the power stroke and increases progressively throughout the entire power stroke, as depicted by the torque curve $T_a$ in FIG. 4. In contrast, the resultant force produced on each pedal of a rotary pedal drive system during each power stroke acts on a variable length torque arm. This torque arm, and hence also the driving torque on the driven shaft, increase from zero at the start of each power stroke to a maximum midway through the stroke and then diminishing to zero during the remainder of the power stroke, as depicted by the torque curve $T_b$ in FIG. 4. In other words, the reciprocatory pedal drive system produces a relatively large and progressively increasing driving torque on the driven shaft throughout each entire power stroke. A rotary pedal drive system does not.

Thus there has been shown and described a novel powered machine and conveyance which fulfills all the objects and advantages sought therefor. Many changes, modifications, variations and other uses and applications of the subject invention will, however, become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

The inventors claim:

1. A user powered machine, comprising:

a body including a seat for a machine user, and a user powered drive system on said body including user actuated means movable by the action of the machine user through alternate power and return strokes, driven means, and mechanical power transmission means connecting said user actuated means and driven means for driving said driven means in one direction of rotation upon movement of said user actuated means through said power and return strokes, and wherein said mechanical transmission means comprises translator means drivably coupled to said driven means for movement in a forward direction to drive said driven means in said one direction of rotation and in an opposite return direction relative to said driven means, and force transmission means connecting said user actuated means and said translator means in a manner such that movement of said user actuated means through said power and return strokes moves said translator means in said forward and return directions alternately to drive said driven means in said one direction of rotation, said driven means comprises a rotary driven shaft, said translator means comprise translator wheel means rotatable on said shaft, and means connecting said wheel means and shaft in a manner such that rotation of said wheel means in said forward direction drives said shaft in its one direction of rotation and said wheel means are rotatable on said shaft in said return direction, said force transmission means comprise cable means trained about and in driving engagement with said translator wheel means between the ends of said cable means, spring means securing one end of said cable means to said body, and means securing the opposite end of said cable means to said suer actuated means, whereby movement of said user actuated means through a power stroke moves said cable means in one endwise direction against the force of said spring means to drive said wheel means in said forward direction and thereby drive said shaft in its one direction of rotation and movement of said suer actuated means through a return stroke releases said cable means for movement in the opposite endwise direction by said spring means to effect rotation of said wheel means in said return direction on said shaft.

2. A user powered machine, comprising:

a body including a seat for a machine user, and a user powered drive system on said body including user actuated means movable by the action of the machine suer through alternate power and return strokes, driven means, and mechanical power transmission means connecting said user actuated means and driven means for driving said driven means in one direction of rotation upon movement of said user actuated means through said power and return strokes, and wherein said mechanical transmission means comprises translator means drivably coupled to said driven means for movement in a forward direction to drive said driven means in said one direction of rotation and in an opposite return direction relative to said driven means, and force transmission means connecting said user actuated means and said translator means in a manner such that movement of said user actuated means through said power and return strokes moves said translator means in said forward and return directions alternately to drive said driven means in said one direction of rotation, said user actuated means comprise two user actuated members independently movable in a reciprocatory motion and power and return strokes by action of the vehicle operator, said driven means comprises a rotary driven shaft, said translator means comprises a pair of translator wheels rotatable on said shaft and associated with said user actuated members, respectively, and means connecting each wheel and said shaft in a manner such that rotation of each wheel in said forward direction rotates said shaft in its one direction of rotation and each wheel is rotatable in said return direction on said shaft, said force transmission means comprise a cable trained between its ends about and in driving engagement with each translator wheel, a spring securing one end of each cable to said body, and means securing the opposite end of each cable to the associated user actuated member, whereby movement of each user actuated member through a power moves the respective cable in one endwise direction against the force of its spring to drive the respective wheel in said forward direction and thereby said shaft in its one direction of rotation and movement of each user actuated member through a return stroke releases the respective cable for movement in the opposite endwise direction by its spring to rotate the respective wheel in said return direction on said shaft.

3. A machine according to claim 1 wherein:
said user actuated means are located forwardly of said and said shaft is located rearwardly of said seat,
said cable means extend rearwardly from said user actuated means, around said translator wheel means, and then upwardly behind said seat and have rear end means located well above the level of said shaft, and
said spring means secure said rear end means of said cable means to said body.

4. A machine according to claim 2 wherein:
said user actuated members are located forwardly of said seat and said shaft is located rearwardly of said seat,
said cables extend rearwardly from said user actuated members, around said translator wheels, and then upwardly behind said seat and have upper ends located well above the level of said shaft, and
said springs secure said upper cable ends to said body.

5. A machine according to claim 3 wherein:
said user actuated members comprise pedals.

6. A machine according to claim 4 wherein:
said user actuated members comprise pedals.

7. A user powered machine, comprising:
a body including a seat for a machine user,
a user powered drive system on said body including user actuated means movable through alternate power and return strokes by action of the vehicle user, rotary driven means, and mechanical power transmission means connecting said user actuated means and said driven means for driving said driven means in one direction of rotation during each power stroke of said user actuated means, and wherein said mechanical transmission means has a drive ratio equal to the ratio of any given power stroke length of said user actuated means and the angle through which said driven means is rotated in said one direction by movement of said user actuated means through said given power stroke length, and said mechanical transmission means includes shift means for varying said drive ratio, said user actuated means comprises two user actuated members each movable through alternate power and return strokes, said mechanical transmission means comprises a separate mechanical transmission connecting each user actuated member and said driven means, and said shift means comprises means for varying the drive ratio of each said separate transmission.

8. A machine according to claim 7 wherein:
said user actuated members comprise pedals.

9. A machine according to claim 8 wherein:
said pedals are independently movable through said power and return strokes and are movable through power strokes by the machine user, and
said mechanical transmission means includes spring means for moving said pedals through return strokes.

10. A user powered machine, comprising:
a body including a seat for a machine user,
a user powered drive system on said body including user actuated means movable through alternate power and return strokes by action of the vehicle user, rotary driven means, and mechanical power transmission means connecting said user actuated means and said driven means for driving said driven means in one direction of rotation during each power stroke of said user actuated means, and wherein said mechanical transmission means comprises a plurality of separate, generally parallel mechanical drive trains, shift means for selectively drivably connecting said user actuated means and said driven means through any of said drive trains, and said drive trains have different drive ratios such that movement of said user actuated means through a power stroke of a certain stroke length when connected to said driven means through one of said drive trains drives said driven means through a first angle in said one direction of rotation, and movement of said user actuated means through a power stroke of said certain stroke length when connected to said driven means through another of said drive trains drives said driven means through a second angle in said one direction of rotation.

11. A machine according to claim 10 wherein:
said mechanical transmission means further comprises a rotary driven shaft coupled to said driven means and rotatable in one direction to drive said driven means in its one direction of rotation,
each of said drive trains comprises a translator drivably coupled to said shaft and movable in a forward direction to drive said shaft in its one direction of rotation and in an opposite return direction relative to said shaft, and a force transmission member connected to said translator and movable in opposite directions to move said translator in its forward and return directions alternately and thereby drive said shaft in its one direction of rotation, and said shift means includes means for selectively connecting the force transmission member of any drive train to said user actuated means for back and forth movement of the connected force transmission member by reciprocatory movement of said user actuated means to drive the corresponding translator means in said forward and return directions alternately and thereby drive said shaft in its one direction of rotation.

12. A machine according to claim 11 wherein:

said user actuated means comprise two user actuated members independently movable through power and return strokes by action of the vehicle user, each of said user actuated members is associated with certain of said drive trains, said translator of each drive train comprises an oscillatory translator rotatable on said shaft, and means connecting said translator to said shaft for rotation of said shaft in its one direction of rotation by rotation of said translator in said forward direction and for rotation of said translator in said return direction relative to the shaft, said force transmission member of each drive train is movable back and forth to oscillate the corresponding translator, and said shift means comprises means for selectively connecting the force transmission member of any drive train to the associated user actuated member in a manner such that reciprocatory movement of the user actuated member drives the corresponding translator in its forward and return directions alternately.

13. A user powered machine, comprising:

a body including a seat for a machine user, a user powered drive system on said body including two user actuated members movable by action of the vehicle user through alternate power stroke and return strokes, rotary driven means, and mechanical power transmission means connecting said user actuated means and said driven means for driving said driven means in one direction of rotation during each power stroke of said user actuated means, and wherein said mechanical transmission means comprises rotary driven shaft means drivably coupled to said first mentioned driven means and rotatable in one direction to drive said latter means in its one direction of rotation, at least two oscillatory translator wheel pairs each including two similar translator wheels rotatable on said shaft means and associated with said user actuated members, respectively, means connecting each wheel and said shaft means in a manner such that each wheel is rotatable in a forward direction to drive said shaft means in its one direction of rotation and each wheel is rotatable in an opposite return direction on said shaft means, a drive cable trained about and disposed in driving engagement with each translator wheel, whereby said transmission means includes a first group of cables drivably engaging the translator wheels associated with one user actuated member and a second group of cables drivably engaging the translator wheels associated with the other user actuated member, shift means for selectively connecting any cable of each cable group to the corresponding user actuated member in a manner such that movement of the respective user actuated member through a power stroke moves the connected cable in one endwise direction to drive its engaged translator wheel in its forward direction and thereby said shaft means in its one direction of rotation through wheel and shaft rotation angles related to the effective diameter of the engaged wheel, cable return means for effecting movement of the connected cable in the opposite endwise direction to drive its engaged translator wheel in its return direction of rotation relative to said shaft means upon movement of the corresponding user actuated member through a return stroke, and the translator wheels of each wheel pair have substantially the same effective diameter and the translator wheels of different wheel pairs have different effective diameters, whereby movement of each user actuated member through a power stroke of certain stroke length when connected to one cable of its respective cable group rotates said shaft means through a certain angle in said one direction of rotation, and movement of each user actuated member through a power stroke of said certain stroke length when connected to another cable of its respective cable group rotates said shaft means through a different angle in said one direction of rotation.

14. A machine according to claim 13 wherein:

said cable return means comprises a spring for urging the respective cable in said opposite endwise direction.

15. A machine according to claim 14 wherein:

said user actuated members comprise pedals located forwardly of said seat and independently movable longitudinally of said vehicle, said drive shaft means are located behind said seat, said cables have front ends for connection said pedals and extend rearwardly from said front ends to said shaft means, then around their respective translator wheels, then upwardly behind said seat, and have rear ends above said shaft means, said springs secure the rear ends of said cables to said body, and said shift means comprise means for selectively securing said front cable ends to the corresponding pedals.

16. A machine according to claim 15 wherein:

said cable springs urge their respective cables to rear retracted positions, said pedals are movable to rear limiting positions, and said shift means comprise a shifter movable with each pedal and adjustable by the machine user to selectively connect said front ends of the corresponding cables to the respective pedal when the pedal occupies its rear limiting position.

17. A machine according to claim 16 wherein:

each user actuated member comprises a carriage mounting the respective pedal and mounted on said body for reciprocatory movement along a fore and aft direction line, each shifter comprises a housing on the rear end of the respective pedal carriage, a ratio selector rotatable in said housing between ratio selecting positions and having circumferential slots spaced along the selector aligned axially of the selector with rearwardly opening holes, respectively, in said housing, said holes and slots in each shifter form coupling sockets for receiving the respective cable couplers and aligned on axes parallel to said direction line of movement of the respective carriage, said mechanical transmission means comprises means for aligning said cable couplers with their respective shifter coupling sockets on said socket axes and positioning the couplers in said rear retracted cable positions for entrance of the couplers to coupling positions in their respective sockets upon movement of the respective carriage to its rear limiting position, and said cable couplers and selector slots having that each selector is adjustable to selectively connect any one of its associated cable couplers and thereby the corresponding cable to the respective pedal carriage.

18. A machine according to claim 13 wherein:
said machine is a land vehicle having wheels, and
said driven means comprises at least one wheel, whereby said drive system drives said one wheel to propel the vehicle.

19. A machine according to claim 13 wherein:
said machine is a buoyant water vehicle, and
said driven means comprise propeller means, whereby said drive system drives said propeller means to propel the vehicle through water.

20. A machine according to claim 13 wherein:
said machine is an exercise machine,
said driven means comprises a rotor, and said machine includes means for resisting rotation of said 21. A drive system, comprising:
a frame,
driving means mounted on said frame for movement through alternate power and return strokes,
rotary driven means on said frame,
mechanical power transmission means connecting said driving means and said driven means for driving said driven means in one direction of rotation upon movement of said driving means through said power and return strokes, and wherein
said mechanical transmission comprises translator means drivably coupled to said driven means for movement in a forward direction to drive said driven means in said one direction of rotation and in an opposite return direction relative to said driven means, and force transmission means connecting said driven means, and force transmission means manner such that movement of said driving means through said power and return strokes moves said translator means in said forward and return directions alternately to drive said driven means in said one direction of rotation,
said driven means comprises a rotary driven shaft,
said translator means comprises an oscillatory translator wheel means rotatable on said shaft, and means coupling said wheel means to said shaft in such manner that rotation of the wheel means in said forward direction drives said shaft in its one direction of rotation and said wheel means are rotatable on said shaft in said return direction, and
said force transmission means comprise cable means trained between its ends about and disposed in driving engagement with said wheel means, spring means securing one end of said cable means to said frame, and means securing the other end of said cable means to said driving means in a manner such that movement of said driving means through a power stroke moves said cable means in one endwise direction to rotate said wheel means in said forward direction, whereby movement of said driving means through a return stroke effects movement of said cable means in the opposite endwise direction to rotate said translator wheel means in said return direction.

22. A drive system, comprising:
a frame,
driving means mounted on said frame for movement through alternate power and return strokes,
rotary driven means on said frame,
mechanical power transmission means connecting said driving means and said driven means for driving said driven means in one direction of rotation upon movement of said driving means through said power and return strokes, and wherein
said mechanical transmission means comprises translator means drivably coupled to said driven means for movement in a forward direction to drive said driven means in said one direction of rotation and in an opposite return direction relative to said driven means, and force transmission means connecting said driving means and said translator means in a manner such that movement of said driving means through said power and return stokes moves said translator means in said forward and return directions alternately to drive said driven means in said one direction of rotation,
said driving means comprise two driving members independently movable in a reciprocatory motion through said power and return strokes,
said driven means comprises a rotary driven shaft,
said translator means comprises a pair of translator wheels rotatable on said shaft and associated with said driving members, respectively, and means connecting each wheel and said shaft in a manner such that rotation of each wheel in said forward direction rotates said shaft in its one direction of rotation and each wheel is rotatable in said return direction on said shaft, and
said force transmission means comprise a cable trained between its ends about and in driving engagement with each translator wheel, a spring securing one end of each cable to said frame, and means securing the opposite end of each cable to the associated driving member, whereby movement of each member through a power moves the respective cable in one endwise direction against the force of its spring to drive the respective wheel in said forward direction and thereby said shaft in its one direction of rotation and movement of each member through a return stroke releases the respective cable for movement in the opposite endwise direction by its spring to rotate the respective wheel in said return direction on said shaft.

23. A drive system, comprising:
a frame,
driving means mounted on said frame for movement through alternate power and return strokes,
rotary driven means on said frame,
mechanical power transmission means connecting said driving means and said driven means for driving said driven means in one direction of rotation during each power stroke of said driving means, and wherein
said mechanical transmission means has a drive ratio equal to the ratio of any given power stroke length of said driving means and the angle through which said driven means is rotated in said one direction by movement of said driving means through said given power stroke length, and said mechanical transmission means includes shift means for varying said drive ratio, said driving means comprises two driving members independently movable through alternate power and return strokes, said mechanical transmission means comprises a separate mechanical transmission connecting each driving member and said driven means, and said shift means comprises means for varying the drive ratio of each said separate transmission.

24. A drive system, comprising:

a frame, driving means mounted on said frame for movement through alternate power and return strokes, rotary driven means an said frame, mechanical power transmission means connecting said driving means and said driven means for driving said driven means in one direction of rotation during each power stroke of said driving means, and wherein said mechanical transmission means comprises a plurality of separate, generally parallel mechanical drive trains, shift means for selectively drivably connecting said driving means and said driven means through any of said drive trains, and said drive trains have different drive ratios such that movement of said driving means through a power stroke of a certain stroke length when connected to said driven means through one of said drive trains drives said driven means through a first angle in said one direction of rotation, and movement of said driving means through a power stroke of said certain stroke length when connected to said driven means through another of said drive trains drives said driven means through a second angle in said one direction of rotation.

25. A drive system according to claim 24 wherein:

said mechanical transmission means further comprises a rotary driven shaft coupled to said driven means and rotatable in one direction to drive said driven means in its one direction of rotation, each of said drive trains comprises a translator drivably coupled to said shaft and movable in a forward direction to drive said shaft in its one direction of rotation and in an opposite return direction relative to said shaft, and a force transmission member connected to said translator and movable in opposite directions to move said translator in its forward and return directions alternately and thereby drive said shaft in its one direction of rotation, and said shift means includes means for selectively connecting the force transmission member of any drive train to said driving means for back and forth movement of the connected force transmission member by reciprocatory movement of said driving means to drive the corresponding translator in said forward and return directions alternately and thereby drive said shaft in its one direction of rotation.

26. A drive system according to claim 25 wherein:

said driving means comprise two driving members independently movable through power and return strokes, each of said driving members is associated with certain of said drive trains, said translator of each drive train comprises an oscillatory translator wheel rotatable on said shaft, and means connecting said translator wheel to said shaft for rotation of said shaft in its one direction of rotation by rotation of said translator wheel in said forward direction and for rotation of said translator wheel in said return direction relative to the shaft, said force transmission member of each drive train comprises a cable trained about and in driving engagement with the corresponding translator wheel and movable back and forth in the endwise directions of the cable to oscillate the corresponding translator, said shift means comprises means for selectively connecting one end of any cable of each drive train to the associated driving member in a manner such that movement of the member through a power stroke moves the connected cable in one endwise direction to drive the corresponding translator wheel in its forward direction, and said mechanical transmission means comprises a spring connecting the other end of each cable to said frame for urging the respective cable in the opposite endwise direction.

* * * * *